Sept. 29, 1942.                K. NÜCHTERLEIN                2,297,428
                                REFLEX CAMERA
                           Filed Jan. 23, 1940              2 Sheets-Sheet 2
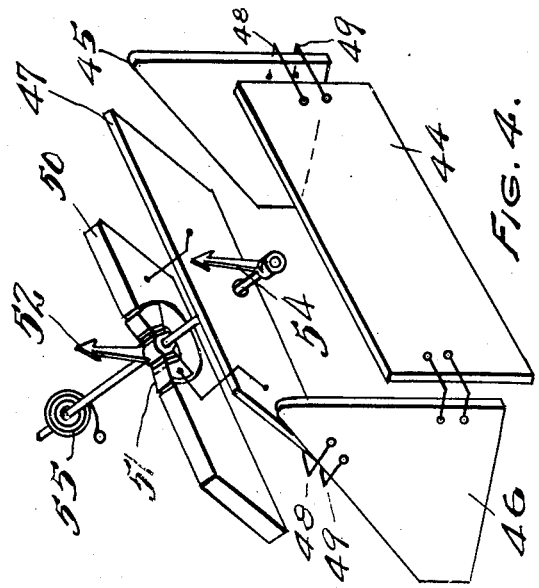
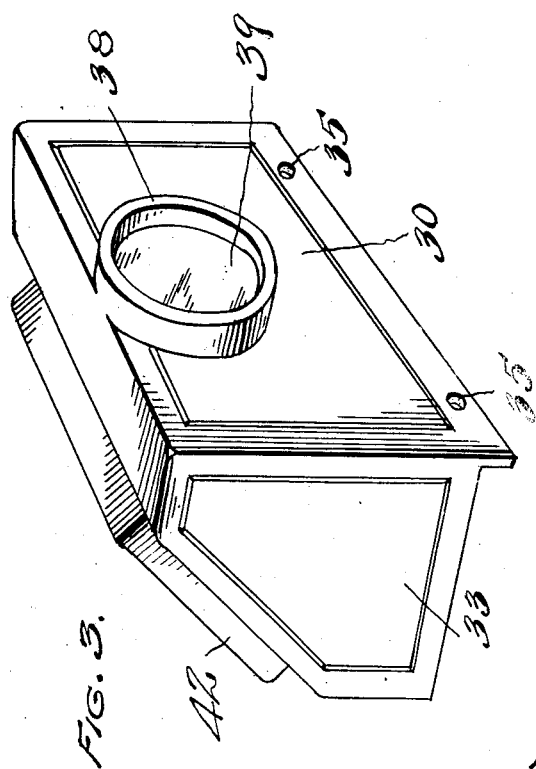
Inventor
KARL NUCHTERLEIN
By Chas K. Davies & Son
     Attys.

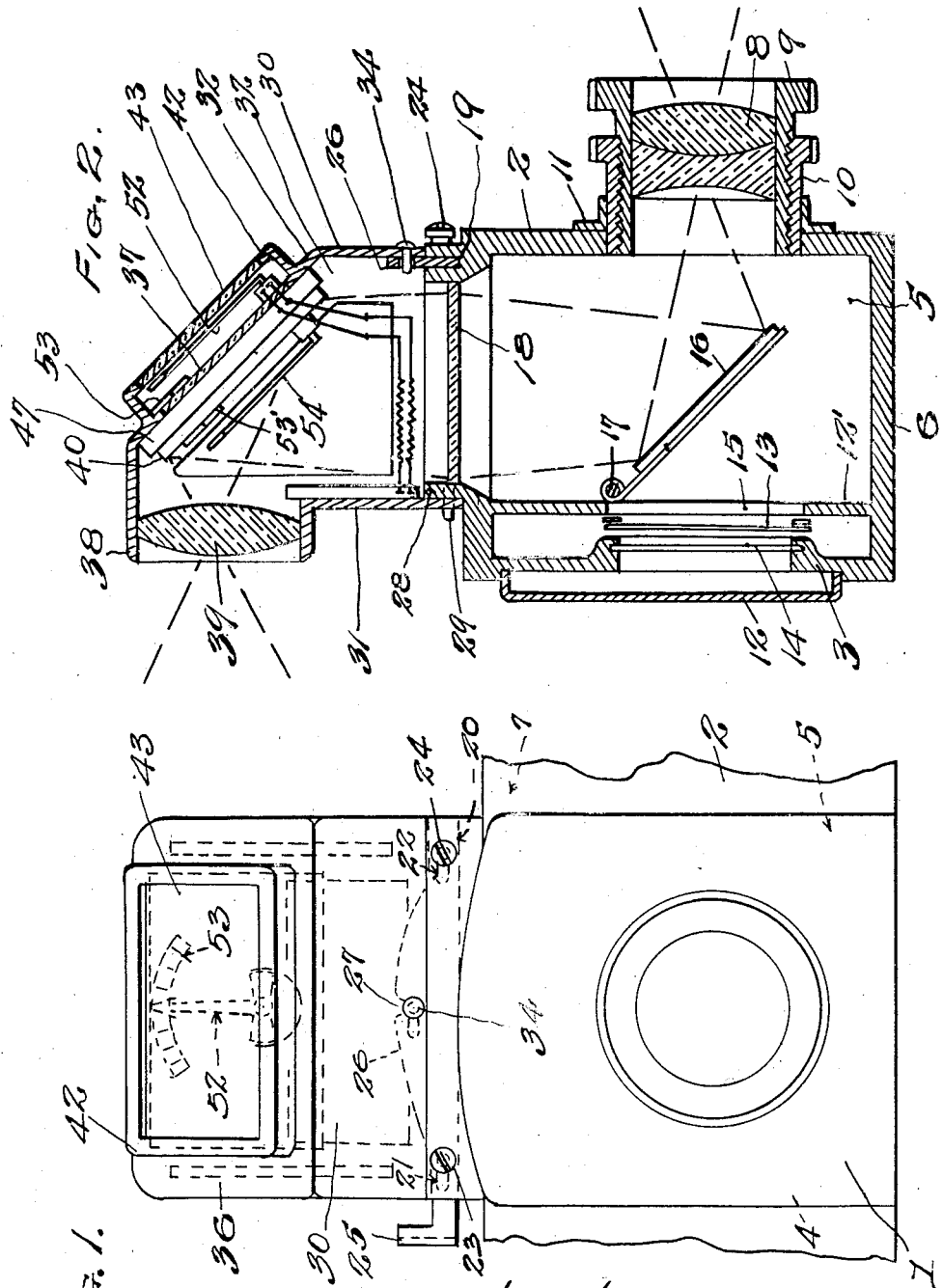

Patented Sept. 29, 1942

2,297,428

UNITED STATES PATENT OFFICE 2,297,428

REFLEX CAMERA

Karl Nüchterlein, Dresden, Germany; vested in the Alien Property Custodian

Application January 23, 1940, Serial No. 315,262
In Germany July 18, 1939

1 Claim. (Cl. 88—23)

My present invention relates to an improvement in reflex cameras and more particularly to the use of an exposure meter of the photo-electric cell type wherein the intensity of the light reflected by the object to be photographed is measured and indicated to the operator of the camera.

The invention consists in providing a camera of the reflex type with a focusing hood, which may be detachable, as shown and described in my companion application executed by me on even date herewith, Serial number 315,261 filed Jan. 23, 1940. The hood is mounted above the ground glass screen and the light coming through the photographic lens and reflected by the reflex mirror in the camera onto the ground glass focusing screen is measured by the photo-electric cells and the result is indicated, as by a needle and scale, to the operator, either inside or outside the hood.

It is believed apparent that the placement of an indicator within the hood is of great value to the photographer. By the use of the hood described in detail hereinafter, the picture or image may be viewed as reflected on the focusing screen and simultaneously the light intensity of the reflected picture is measured and indicated in the line of vision of the operator. Thus two distinct advantages are apparent; the capability of simultaneously focusing and composing the image, and measuring the light intensity, and secondly measuring and indicating the result, of the actual light rays passing through the photographic lens.

In modern photography, particularly with the miniature cameras, it is necessary that all of the steps of correctly focusing, composing and exposing the picture be simplified as far as possible and to that end by placing a light meter on the camera and in the particular position indicated, I have reduced the separate and independent steps and eliminated at least one step, i. e. the measuring of the light intensity prior to the picture composition.

In the accompanying drawings I have illustrated one complete example of the physical embodiment of my invention according to the best mode I have thus far devised, but it will be understood that various changes and alterations in the exemplified structure may be made within the scope of the appended claim.

In the drawings,

Figure 1 is a partial front elevation of a conventional reflex camera showing the hood mounted thereon with the needle and indicating scale visible through a window in the hood.

Figure 2 is a vertical sectional view showing the camera and the hood with the parts in related position.

Figure 3 is a perspective view of the hood.

Figure 4 is a diagrammatic view of the photo-electric cells together with the armature, the needle and the magnet.

Referring now to the drawings, the camera is designated generally as 1 and having a central light chamber formed by the front and rear walls 2 and 3, and the side walls or partitions 4 and 5, bottom 6 and top 7.

In the front wall 2 of the camera, I have mounted an objective lens 8 in its exteriorly threaded barrel 9. This barrel is adapted for positioning in the interiorly threaded tubular casing 10 secured to the wall 2 as by the ring 11. The objective lens is, of course, adapted for movement in the casing to focus the object to be photographed.

The rear wall 3 is formed with a removable back plate 12 secured in any desirable manner, and in a compartment formed between the back wall 3 and a partition 12' the focal plane shutter 13 and the film 14 are adapted for advance and exposure as by a feeding and advancing head of any suitable character, not shown. The partition 12' is fashioned with an aperture 15 therein.

Immediately above the rear aperture in the partition 12' I have mounted a mirror 16 hinged as at 17 and adapted upon actuation of the exposure button, not shown, to be automatically elevated to approximately horizontal position out of the path of light passing along the optical axis of the camera so that the image will be recorded on the film. As the exposed film is advanced and the shutter reset, the mirror is automatically lowered to the focusing position shown in Figure 2.

In the top wall 7 I utilize an image forming ground glass or focusing screen 18 which is aligned in the optical axis of the camera and forms the image of the object for examination and focusing, prior to photographing through the objective lens 8.

The front edge of the top wall 7 is grooved as at 19, and adapted to receive a locking plate 20. This plate 20 is formed with spaced, elongated openings therein 21 and 22 and clamp nuts 23 and 24 are positioned in the front edge of the top wall so as to engage the locking plate through the elongated openings by means of which the plate may be moved longitudinally in the groove as by handle 25.

The plate 20 is formed with a central, heightened, arcuate upper edge 26 and the highest point of the arc is formed with an open end slot 27. The rear edge 28 of the top wall is provided with a rearwardly extending pair of spaced pins 29.

Adapted to be detachably mounted above the ground glass screen 18 I utilize a hood having front and rear walls 30 and 31 and side walls 32 and 33. The front wall of the hood is provided with a headed stud pin 34 projecting into the interior of the hood and adapted to engage the open end slot 27, and the rear wall 30 of the hood is formed with spaced openings 35 adapted to engage over the pins 29. When the pins and their adjacent openings are engaged, the locking plate may be moved to the right in Figure 1 and the hood can then be locked in place by means of clamp nuts 23.

The front wall 30 of the hood is backwardly inclined as at 36 and formed within a rectangular opening in the inclined wall in a glass plate 37. The rear wall 31 is fashioned with an outwardly extending collar or ring 38 in which is supported a magnifying finder lens or focusing lens 39.

On the inner side of the inclined hood wall 36 I place a semi-transparent mirror 40 which as shown by the dash lines in Figure 2 is aligned with the optical axis of the camera and the lens 39. An exterior indicator housing or casing 42 is mounted over the glass frame plate 37 and formed with a transparent window 43.

On the inner side of each wall of the hood, I secure a photo-electric cell of the photo-voltaic type, the cells being indicated as 44, 45, 46, and 47. These cells are electrically connected as by pairs of wires 48 and 49 to a magnet 50 and an armature 51 mounted in the casing 42. A needle 52 is fixed on the armature and it is adapted to move from left to right in Figure 1 across the arcuate scale 53. The shaft of the armature extends through the mirror 40 and the cell 47 and supports another needle 54 operable simultaneously with the needle 52. A coil spring 55 on the armature shaft is so mounted as to tend to press the needles toward the zero indication on the scale.

The cells 44, 45, 46, and 47 are, of course, activated by the light rays passing along the optical axis of the camera and the amount of light or its intensity is recorded on the scale 53 by the needle 52 to the operator on the outer side, or by the needle 54 and scale 54' which may be viewed through the lens 39.

In either use, to the operator is revealed the actual light intensity available through the objective lens 8 and not the condition somewhere near the lens and exterior of the camera.

By viewing the object to be photographed through the magnifying lens 39, the operator may stop down the lens diaphragm to the desired point and then measure the light condition after which the shutter 13 may then be set for the desired speed, taking into consideration, of course, the film speed and any other conditions.

With the utilization of the indicator and needle visible through the window 43, the device may be employed as a complete independent exposure meter as in Figure 3, the light entering through the lens 39, and activating the cells as described before. The device may be bodily detached from the camera by manipulating the locking plate 20 and the device used as stated.

It is of special advantage however, that the meter be employed with the reflex type camera wherein every element necessary to a proper exposure may be adjudged while the actual object to be photographed is being viewed and focused on the ground glass screen.

While I have described one specific adaptation of the details of the device herein, it will be understood that various changes and alterations may be made within the scope of the following claim.

I claim:

The combination in a reflex camera including its ground glass screen, of a quick detachable hood mounted on the camera above the screen and means for fastening the hood on the camera, a finder mirror mounted in the hood in operative relation to the screen, a finder lens operatively aligned with the mirror, a photoelectric cell mounted on the mirror within the hood, and an electric meter mounted in the hood and visible through the finder lens electrically connected with the cell for indicating the intensity of the light passing through the optical axis of the camera.

KARL NÜCHTERLEIN.